2,883,592

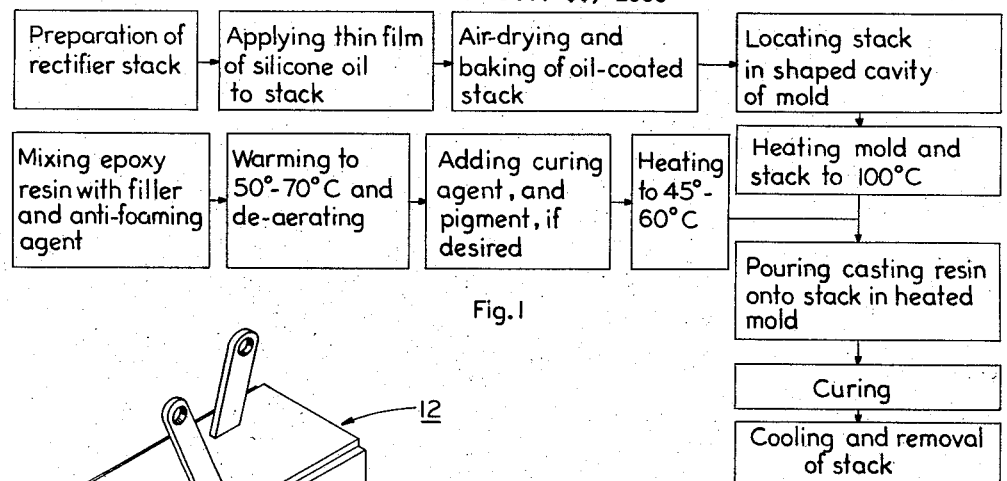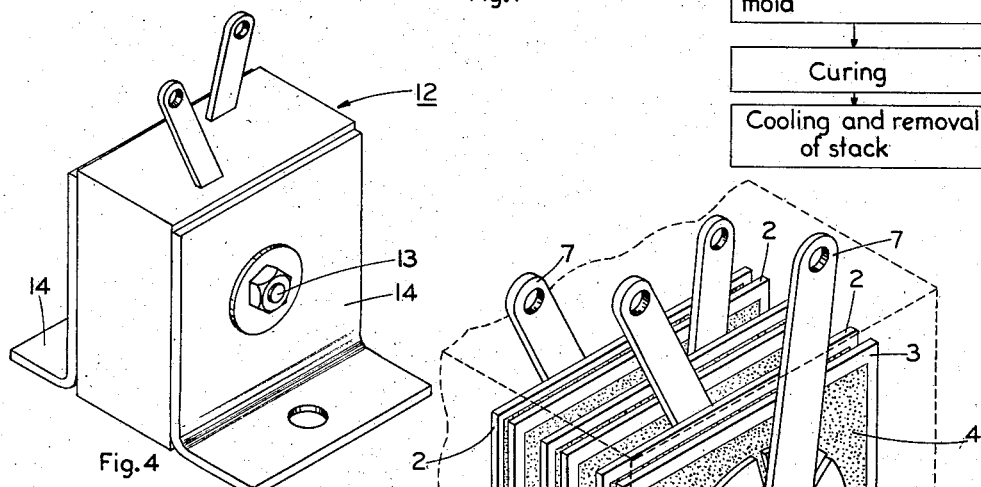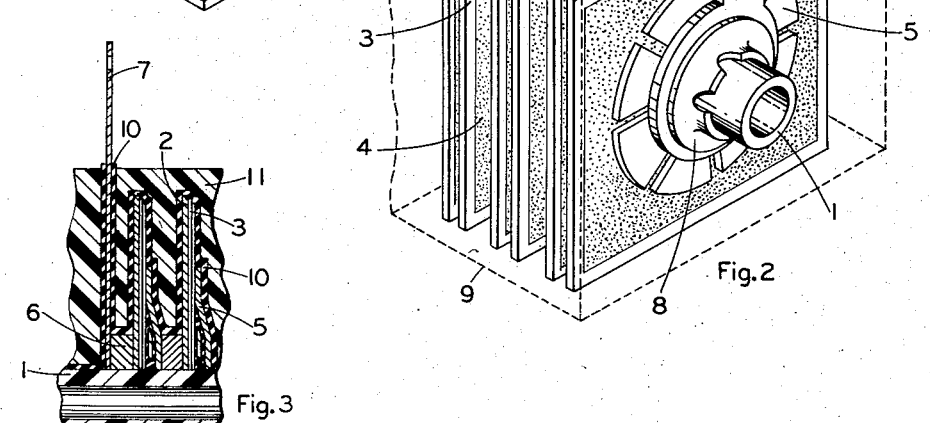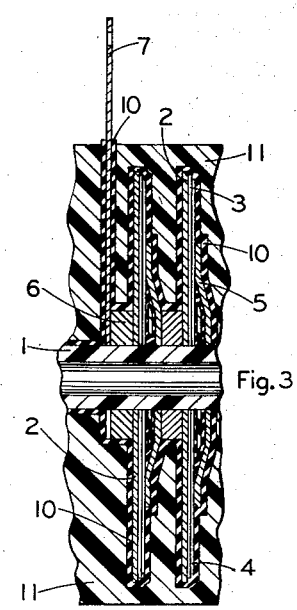
Inventors:
Lester W. Burton
John R. Thurell, Jr.
by, James E. Mrose
Their Attorney United States Patent Office 2,883,592
Patented Apr. 21, 1959

ENCAPSULATED SELENIUM RECTIFIERS

Lester W. Burton, Danvers, and John R. Thurell, Jr., Peabody, Mass., assignors to General Electric Company, a corporation of New York Application December 30, 1955, Serial No. 556,693

9 Claims. (Cl. 317—234)

The present invention relates to improved contact rectifiers and, more particularly, to integral molded selenium rectifier assemblies wherein cell short-circuiting and the build-up of high leakage paths are minimized.

Advantages accruing from the encapsulation or "plotting" of certain electrical apparatus in such materials as resinous plastics are currently well understood. In addition to the heightened over-all electrical insulation which encapsulating materials may provide, there is reduced susceptibility to or immunity from effects of abrasion, physical shock, and contaminated atmospheres. However, utilization of encapsulation techniques with certain rectifiers to partake of such advantages has occasioned the serious difficulty that short circuiting and high electrical leakage in undesired directions may occur and and persist, thus rendering the rectifiers faulty as unidirectional current conductors.

Selenium rectifiers, for example, commonly experience what appears to be a sparking on their counterelectrode surfaces, this action perhaps taking place because of rapid and very localized short-circuiting between the base plate and counterelectrode through the intermediate selenium and barrier. Physical irregularities in the cell constructions, weaknesses in the selenium layer, and high applied voltages may contribute to such shorting. Upon occurrence of such shorts in the usual unpotted rectifier, the thin counterelectrode material of relatively low melting point melts and forms a small hole or puncture about the locus of the short through the cell. When this puncture is completed, the counterelectrode no longer contacts the baseplate, and the rectifier has been self-healed such that, thereafter, it functions satisfactorily. This action takes place very quickly, and resembles a tiny flash or spark, leaving only a dark spot on the counterelectrode surface.

It has been found that encapsulation of such rectifiers with plastic results in continued rather than self-healing shorting. Resistance in the reverse direction then becomes intolerably low and the rectifiers do not function properly. Apparently, the arcing and high temperatures associated with localized short-circuiting occasions carbonization of the organic components of the plastic, and the carbonaceous deposits in intimate contact with the counterelectrode and shorted selenium layer are of a low resistance which perpetuates the shorted condition. The rectifier is thus unable to burn out its defect. This phenomenon has precluded effective "potting" of dry contact rectifiers susceptible to such shorting.

Accordingly, it is an object of the present invention to provide a novel and improved method for encapsulating contact rectifiers which results in minimized shorting failures.

Further, it is an object to provide a low-cost plastic-encapsulated rectifier of the type having a baseplate, a low-melting-point counterelectrode, and at least one intermediate rectifier layer, wherein cell short-circuiting is suppressed by the action of a protective film or layer.

By way of a summary account of one aspect of this invention, we first construct a stack of selenium rectifier cells, with the coupling terminals thereof extending a convenient distance beyond the edges of the cells. Next, the completed stack is dipped, sprayed, or otherwise coated with a thin silicone oil such that the counterelectrode surfaces of the cells are wholly covered by the silicone oil, which is dried to form a practically invisible film or layer. Subsequently, the rectifier stack having the silicone-oiled cell counterelectrodes is located within the shaped cavity of a mold, and the temperature of the mold and stack is elevated to about 100° C. The plastic material which is to encapsulate the stack is one which possesses expansion and contraction characteristics about the same as the aluminum baseplate material of the stack cells, such that damage will not occur to the plastic or cells during use of the completed rectifier. An inexpensive epoxide casting resin having these characteristics is mixed, heated to between 45 and 60° C., and poured into the heated mold leaving only the ends of the stack terminals exposed for electrical connection purposes. Curing of the casting material is performed at an elevated temperature for an appropriate interval, and the rectifier unit is permitted to cool prior to its removal from the mold. The resulting encapsulated unit is one in which the silicone-oiled counterelectrodes are self-healing, as though they were wholly exposed to air.

Although the features of this invention which are believed to be novel are set forth in the appended claims, greater detail of the practice of the invention in connection with preferred embodiments, and the further objects and advantages thereof, may be readily comprehended through reference to the following description taken in connection with the accompanying drawings, wherein:

Figure 1 is a block diagram setting forth a process for the practice of our invention;

Figure 2 provides a pictorial view of part of a rectifier stack prior to encapsulation in accordance with the present teachings;

Figure 3 illustrates a cross-section of part of a self-healing and encapsulated rectifier stack; and Figure 4 pictures one form of completed stack together with mounting hardware.

In the manufacture of selenium rectifiers, individual rectifier cells are commonly grouped together in one integral stack, the electrical interconnections between cells being made to satisfy requirements of the particular circuitry with which the stack is to be associated. Each selenium rectifier cell includes a flat metal baseplate, at least one rectifying layer of selenium superimposed upon at least one side of the baseplate, and a thin counterelectrode applied to the surface of the selenium layer. The latter electrode is usually sprayed upon the selenium, and is an alloy which possesses a relatively low melting point. Because of its low melting point and its thinnness, the counterelectrode tends to deteriorate in tiny areas by melting, vaporizing, or breaking away when the aforementioned localized short circuits develop between it and the baseplate through the selenium. In the heretofore conventional selenium rectifier stacks, most of the surface areas of the cell counterelectrodes have either been exposed directly to air or covered merely by a thin coat of paint or varnish, and the counterelectrode flashing or sparking at spots where short circuits have developed has been beneficial from the standpoint of rectifier self-healing. That is, the counterelectrode material is melted, vaporized, or broken away from the locus of the electrical short, and the rectifier is healed in that the short circuit or high leakage path is no longer recognized by the rectifier cell. Thin paint or varnish coatings generally deteriorate with the counterelectrode also, and while they tend to leave carbonaceous deposits which might perpetuate the shorted condition, it is found in practice that the counterelectrode and paint quickly deteriorate in a manner which isolates the short circuits from the rectification circuits. The situation is otherwise in the case of rectifier cells heavily encapsulated in organic resin materials, however, since the carbonaceous residue developed by localized short circuits prevents self-healing by preserving a low resistance path between baseplate and counterelectrode. One known arrangement for avoiding this particular difficulty has involved the meticulous wrapping of a rectifier stack with an insulating tape prior to encapsulation in plastic, such that cell counterelectrodes are exposed only to the air trapped within the wrapping. Not only is such an arrangement costly and difficult to produce, but heat built up within the entrapped air pocket during operation of the rectifier does not escape freely, and the resulting poor heat transfer characteristic limits the usefulness of such stacks and promotes early failures.

The shape and size of rectifier cells occasions a further difficulty in connection with potting of these members. Commonly they are flat and have a thickness which is very small in comparison with their transverse circular or rectangular dimensions. With encapsulating plastics which do not expand and shrink at about the same rate as the rectifier baseplate materials with changes in temperature, the plastic tends to crack. Others have proposed that rubbers, waxes, etc., be utilized in sufficient thickness about certain potted devices to prevent such occurrences, but it will be noted that the provision of such buffer materials about thin flat rectifier cells would necessitate thick coatings about the very thin outer edges of rectifier cells and that these could not be readily provided without thickly coating the entire rectifier stack and thereby influencing the heat transfer characteristics of the rectifier.

One preferred practice utilizing our present teachings and avoiding the foregoing difficulties is diagrammed in Figure 1, where the process involves selenium rectifier stacks having the construction illustrated in Figure 2. The individual rectangular rectifier cells, six of which are illustrated mounted upon the central hollow insulating mounting tube 1, each include a thin flat aluminum baseplate 2, a layer 3 of selenium upon one surface, and a counterelectrode 4 sprayed upon the selenium rectifying material. Spring washers 5 afford electrical contact with the counterelectrodes 4, and spacer washers 6 (shown in Figure 3) further separate the cells such that they provide more effective heat transfer to the surrounding medium. Terminals 7 project outwardly from the stack along only one side thereof to permit electrical connections to be made to the baseplates and counterelectrodes, and lock-washers 8 may hold the cells onto the mounting tube.

A selenium rectifier stack of this construction is next dipped into a silicone oil. Preferably the silicone oil is in an emulsified form, such as a water emulsion or a mixture with a volatile liquid organic material. One suitable silicone oil is commercially available under identification as Dow Corning #20 compound. Emulsion form is desirable in that a particularly thin film of silicone oil can be achieved over all rectifier stack surfaces upon drying and baking to volatilize all of the emulsion material other than the silicone oil. Accordingly, the dipped stack is then air-dried for 30 minutes and baked for 30 minutes at a temperature of 100° C. A practically invisible film of silicone oil alone coats the stack surfaces, including all exposed counterelectrode areas, and it is this film which precludes the undesired carbonization mentioned earlier herein. The silicone-oiled rectifier stack is then located within a shaped cavity of an open-ended mold, with its electrical terminals projecting upward toward the open end. In the case of 2-inch square cells, the stack may be located in a mold cavity which will permit ⅛-inch wall thicknesses of potting compound all around the cell edges. For 1-inch and 1½-inch square cells, a potting compound wall thickness of ¹⁄₁₆ inch is found to be satisfactory. Ends of the hollow mounting tube 1 should be closed during encapsulation, as by their tight fit with the mold cavity walls. When the rectifier stack is properly located within the mold cavity, the mold and stack are heated to 100° C. for not more than two hours.

The stack and mold are at this point ready to receive an appropriate low-cost organic thermosetting casting resin. Polyester and epoxy casting resins are suitable. As was noted hereinbefore, the silicone oil film is extremely thin and the flat aluminum baseplates of the rectifier cells are relatively wide, such that the silicone oil film does not afford the sizeable cushioning effect which would be needed to prevent cracking of the plastic upon occurrence of large relative expansions and contractions of baseplate and potting resin with large temperature variations. For this reason, the resin is first mixed with a filler material in such proportions that the cast resin will have a temperature coefficient of expansion substantially the same as that of the baseplate material. In the case of selenium rectifier cells having aluminum baseplates, note, for example, that the unfilled epoxy and polyester casting resins have higher temperature coefficients of expansion than aluminum. Using an epoxy resin, such as that commercially available under the identification Epon 828, we mix 100 parts of this resin with 125 parts of silica flour filler, adding the resin to the flour and stirring thoroughly to obtain a homogeneous mixture. Other fillers and appropriate proportions may be employed, some common fillers being clay, talc, and carbonates. An anti-foaming agent, such as Silicon Antifoam SS–66, may be added to the mixture. Warming of this mixture follows, to between 50 and 70° C., and de-aerating under a vacuum is advantageous. Hardening of the mixture is realized through use of a hardener, such as the amine or anhydride hardeners used with epoxy resins, or a catalyst, such as a peroxide catalyst used with polyester resins. With the aforementioned epoxy resin and silica flour filler, ten parts of an amine hardener such as the commercially-available product known as Shell Curing Agent D may be added, together with a desired pigment. This casting resin mixture is then heated to between 45 and 60° C. and poured slowly into the mold, while the mold and silicone-oiled stack are maintained at a temperature of about 100° C., until the rectifier stack cells are covered by a desired depth. The electrical terminals are not completely covered, but project upwardly out of the casting material. Curing at an elevated temperature is then performed; suitable times and temperatures being, for example, 2 hours at 100° C., and 4 hours at 80° C. Thereafter, the mold and encapsulated stack are cooled to room temperature, the stack is removed from the mold, and electrical interconnections between terminals and mechanical mounting operations may then be performed.

Dashed outline 9 in Figure 2 represents the outline of encapsulating material which may be molded about the illustrated portion of a rectifier stack. In practice, it has been found that stacks of length many times their transverse dimensions may be encapsulated in accordance with our teachings and will exhibit excellent heat transfer characteristics. The cross-sectional view of encapsulated rectifier cells shown in Figure 3 exaggerates the thickness of the silicone oil film 10 for purposes of clarity, although actually such a film does not exceed two thousandths of an inch. This view illustrates the protective relationship of the silicone oil 10 to the counterelectrodes 4, whereby the filled casting resin 11 is prevented from coming in direct contact with the cell counterelectrodes. In Figure 4, a fully encapsulated rectifier unit 12 is shown together with a through bolt 13 fastening the rectifier stack to mounting brackets 14.

Copper oxide rectifiers of constructional similarity to selenium rectifiers likewise experience localized shorting conditions and may likewise employ our teachings with the same advantages. And, while in a preferred practice of our invention a light silicone oil is employed to achieve the improved characteristics, other silicone polymers, such as the thicker oils, greases, varnishes and elastomers, are also useful in protecting the rectifier cells from the build-up of carbonaceous deposits where they might perpetuate shorted conditions. Moreover, it will be understood that while particular preferred embodiments of this invention have been shown and described herein, various changes and modifications can be accomplished without departing either in spirit or scope from our invention as set forth in the appended claims.

What we claim as new and desire to secure by Letters Patent of the United States is:

1. The method of making a sealed self-healing selenium rectifier of the type having at least one cell with a metal baseplate, a layer of selenium on said baseplate, and a counterelectrode on said layer susceptible to localized deterioration under influence of localized short circuits between said baseplate and counterelectrode, which comprises dipping said cell into a water emulsion of silicone oil such that all exposed areas of said cell are coated with said emulsion, drying said cell until the water from said emulsion is removed and said counterelectrode is coated with a thin film of silicone oil, locating said cell in a mold, pouring into said mold and covering said cell with an organic thermosetting casting resin material, and curing said resin material at an elevated temperature.

2. The method of making a sealed self-healing selenium rectifier of the type having a plurality of rectifier cells each including a baseplate, at least one layer of selenium on said baseplate, and a counterelectrode on said layer susceptible to localized deterioration under influence of localized short circuits between said baseplate and counterelectrode, which comprises first assembling said selenium rectifier cells into a stack wherein the cell counterelectrodes have exposed areas, next dipping said stack into a water emulsion of silicone oil such that all exposed areas of said stack are coated with said emulsion, drying said stack until the water from said emulsion is removed and said counterelectrode areas are coated with a thin film of silicone oil, locating said stack in a mold, pouring into said mold and covering said cells with an organic thermosetting casting resin material, and curing said resin material at an elevated temperature.

3. The method of making a sealed self-healing selenium rectifier of the type having a plurality of rectifier cells each including a flat aluminum baseplate, at least one layer of selenium on said baseplate, and a counterelectrode on said layer susceptible to localized deterioration under influence of localized short circuits between said baseplate and counterelectrode, which comprises assembling said selenium rectifier cells into a stack wherein the cell counterelectrodes have exposed areas, dipping said stack into a water emulsion of a silicone oil such that all exposed areas of said cells are coated with said emulsion, drying the dipped stack until the water from said emulsion is removed and said counterelectrode areas are coated with a thin film of silicone oil, locating said stack in a mold, mixing about 100 parts of epoxy resin with about 125 parts of silica flour filler, by weight, adding a curing agent to the mixture of resin and filler, pouring said mixture with said curing agent added into said mold and covering said rectifier cells therewith, and then curing the filled resin at an elevated temperature to form an integral encapsulated selenium rectifier unit.

4. A sealed self-healing rectifier comprising at least one cell having a metal baseplate, a layer of rectifying material upon said baseplate, and a thin counterelectrode on said material susceptible to localized deterioration under influence of localized short circuits between said baseplate and counterelectrode, a silicone polymer film covering all exposed surfaces of said counterelectrode, and a body of organic casting resin molded about said cell in encasing relationship thereto.

5. A sealed self-healing rectifier comprising a plurality of rectifier cells each having a metal baseplate, a layer of rectifying material upon said baseplate, and a counterelectrode on said material susceptible to localized deterioration under influence of localized short circuits between said baseplate and counterelectrode, means mounting said cells in spaced relation to one another such that counterelectrodes of said cells have large exposed areas, a thin silicone polymer film coating all of said exposed areas of said counterelectrodes, and an organic casting resin having substantially the same temperature coefficient of expansion as said metal baseplates molded about said coated cells in intimate encasing relationship thereto.

6. A sealed self-healing rectifier comprising a plurality of rectifier cells each having a metal baseplate, a layer of rectifying material upon said baseplate, and a counterelectrode on said material susceptible to localized deterioration under influence of localized short circuits between said baseplate and counterelectrode, means mounting said cells in spaced relation to one another such that counterelectrodes of said cells have large exposed areas, a thin film of silicone oil coating all of said exposed areas of said counterelectrodes, and a body of organic casting resin material molded about and between said cells and in encasing relationship thereto.

7. A sealed self-healing selenium rectifier comprising a plurality of selenium rectifier cells each having a counterelectrode susceptible to localized deterioration under influence of localized short circuits therethrough, means mounting said cells together in spaced parallel relationship as a stack with large areas of said counterelectrodes exposed, electrical terminals coupled with at least certain of said cells, a thin film of silicone oil covering all exposed surfaces of said stack, and a body of organic casting resin material molded about and between said cells in abutting relationship to all enfilmed surfaces of said stack and with ends of said terminals projecting out of said body, said resin material including a thermosetting organic resin and a filler material mixed therewith.

8. A sealed self-healing selenium rectifier comprising a plurality of selenium rectifier cells each having an aluminum baseplate, at least one layer of selenium rectifying material upon said baseplate, and a counterelectrode of said material susceptible to localized deterioration under influence of localized short circuits between said aluminum baseplate and counterelectrode, means mounting said selenium cells together in spaced parallel relationship as a stack with large areas of said counterelectrodes exposed, electrical terminals coupled with at least certain of said cells, a thin film of silicone oil covering all exposed surfaces of said stack, and a body of organic thermosetting casting resin material molded about and between said cells in abutting relationship to all enfilmed surfaces of said stack and with ends of said terminals projecting out of said body, said resin material including an epoxy resin and a silica flour filler mixed therewith in a relation of 125 parts of said filler to 100 parts of said epoxy resin, by weight.

9. The invention defined by claim 4 in which the organic casting resin and the metal baseplate have substantially the same temperature coefficient of expansion.

References Cited in the file of this patent
UNITED STATES PATENTS

| | | |
|---|---|---|
| 2,258,218 | Rochow | Oct. 7, 1941 |
| 2,548,353 | Cunningham | Apr. 10, 1951 |
| 2,737,618 | Eisler | Mar. 6, 1956 |
| 2,758,263 | Robillard | Aug. 7, 1956 |

OTHER REFERENCES

Javitz: "Cast Resin Embedments"; Electrical Manufacturing; September 1951; pp. 103–118.

Kuehlthau: "Silco-Flex Insulation"; Allis-Chalmers Electrical Review; 2nd quarter, 1955.